United States Patent
Takano (10) Patent No.: US 10,239,176 B2
(45) Date of Patent: Mar. 26, 2019

(54) METHOD FOR EVALUATING TOOL INSTALLATION, AND MACHINE TOOL

(71) Applicant: MAKINO MILLING MACHINE CO., LTD., Tokyo (JP)

(72) Inventor: Yuji Takano, Yamanashi (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 0 days.

(21) Appl. No.: 15/551,647

(22) PCT Filed: Mar. 2, 2015

(86) PCT No.: PCT/JP2015/056099
§ 371 (c)(1),
(2) Date: Aug. 17, 2017

(87) PCT Pub. No.: WO2016/139726
PCT Pub. Date: Sep. 9, 2016

(65) Prior Publication Data
US 2018/0036854 A1 Feb. 8, 2018

(51) Int. Cl.
*B23Q 17/00* (2006.01)
*G05B 19/401* (2006.01)
(Continued)

(52) U.S. Cl.
CPC .......... *B23Q 17/003* (2013.01); *B23Q 11/005* (2013.01); *G05B 19/401* (2013.01);
(Continued)

(58) Field of Classification Search
CPC .................. B23Q 17/003; B23Q 17/00; B23Q 2717/006; B23B 31/00; G05B 15/02
See application file for complete search history.

(56) References Cited

U.S. PATENT DOCUMENTS 4,915,553 A * 4/1990 Lazarevic ............. B23B 31/263
  408/56
5,393,177 A * 2/1995 Cook ................ B23B 29/03457
  408/13
(Continued)

FOREIGN PATENT DOCUMENTS

DE     19937447     2/2001
EP     0258989      3/1988
(Continued)

OTHER PUBLICATIONS

International Search Report dated May 12, 2015, directed to PCT Application No. PCT/JP2015/056099; 3 pages.

*Primary Examiner* — Charles R Kasenge
(74) *Attorney, Agent, or Firm* — Morrison & Foerster LLP (57) ABSTRACT

Provided is a method for evaluating tool installation when fastening a tool to a main shaft of a machine tool, wherein the method includes a storage step for storing a reference location of a draw bar at the time when the tool is contacting a mounting seat of the main shaft, in a state in which foreign matter has been removed from the surface of the mounting seat and from the contacting surface of the tool. The method for evaluating tool installation includes a measuring step for measuring a measurement location of the draw bar when the tool is installed on the main shaft, and a determination step for determining the installation state of the tool to be abnormal if a measurement-location error with respect to the reference location exceeds a predetermined determination range.

3 Claims, 5 Drawing Sheets

(51) Int. Cl.
  *B23Q 11/00* (2006.01)
  *G05B 15/02* (2006.01)
  *B23B 31/26* (2006.01)

(52) U.S. Cl.
  CPC ...... *B23B 31/265* (2013.01); *B23Q 2717/006* (2013.01); *G05B 15/02* (2013.01)

(56) References Cited

U.S. PATENT DOCUMENTS

| | | | | |
|---|---|---|---|---|
| 5,749,819 | A * | 5/1998 | Yan | B23Q 3/1554 483/39 |
| 5,783,887 | A * | 7/1998 | Ueyama | B23Q 1/70 310/90.5 |
| 6,473,951 | B1 * | 11/2002 | Nakaminami | B23B 31/261 29/27 C |
| 7,033,308 | B2 * | 4/2006 | Fujimoto | B23Q 3/15706 15/415.1 |
| 7,217,230 | B2 * | 5/2007 | Hyun | B23B 31/261 408/240 |
| 2003/0071526 | A1 | 4/2003 | Faigle | |
| 2005/0009679 | A1 * | 1/2005 | Fujimoto | B23Q 3/15706 483/13 |
| 2006/0239788 | A1 * | 10/2006 | Hyun | B23B 31/261 409/233 |
| 2015/0145193 | A1 * | 5/2015 | Ogawa | B23Q 17/005 269/24 |

FOREIGN PATENT DOCUMENTS

| | | |
|---|---|---|
| JP | 5-50359 | 3/1993 |
| JP | 2001-50863 | 2/2001 |
| JP | 3159923 | 2/2001 |
| JP | 2007-283461 | 11/2007 |
| JP | 2008-246610 | 10/2008 |
| JP | 2014-81303 | 5/2014 |
| JP | 2014-100761 | 6/2014 |

\* cited by examiner

METHOD FOR EVALUATING TOOL INSTALLATION, AND MACHINE TOOL

CROSS-REFERENCE TO RELATED APPLICATION

This application is a U.S. National Stage Application of International Patent Application No. PCT/JP2015/056099, filed on Mar. 2, 2015, which is hereby incorporated by reference in the present disclosure in its entirety.

FIELD OF THE INVENTION

The present invention relates to a tool mount evaluation method for evaluating a mounted state of a tool and a machine tool.

BACKGROUND OF THE INVENTION

When a machine tool is used for machining a workpiece, a tool is mounted on a spindle of a spindle device. When the tool is fixed on the spindle, the tool is press-fitted into an attachment seat such as a tapered hole or an end surface that is formed in the spindle. In order to fix the tool to the spindle, it is known that a draw rod, which is referred to as a draw bar, is arranged in the spindle device and draws the tool toward an interior of the spindle so that the tool is fixed to the spindle.

For example, Specification of Japanese Patent No. 3159923 and Japanese Unexamined Patent Publication No. 5-50359A disclose a spindle device in which a draw bar is arranged in a hollow portion of a spindle that is provided rotatably with respect to a housing. The draw bar includes, at a distal end portion thereof, a collet configured to open and close when the draw bar moves in an axial direction. The collet is configured to hold and release a rear end portion of the tool. When the draw bar draws the tool inward in a state in which the collet holds the tool, the tool is fixed to the spindle.

PATENT LITERATURE

Patent Literature 1: Specification of Japanese Patent No. 3159923.

Patent Literature 2: Japanese Unexamined Patent Publication No. 5-50359A.

BRIEF SUMMARY OF INVENTION

When workpieces are machined with a machine tool, several types of tools may be used for machining one workpiece. In such a case, the tool may need to be exchanged. When several types of tools are used for machining, a machine tool that is provided with a tool exchange device for exchanging tools is used.

When the machine tool is used for machining a workpiece, chips, machining fluid and the like which are generated by machining may scatter. Consequently, foreign substances such as chips, machining fluid, and the like may enter a contact portion between the tool and the spindle. For example, foreign substances may be adhered to a surface of a tapered portion of the tool while the tool is exchanged. Foreign substances may also be adhered to a tapered hole in the spindle.

When the tool is mounted on the spindle in a state in which foreign substances are adhered on the tapered portion of the tool or in the tapered hole in the spindle, a state in which the foreign substances are interposed between the tool and the spindle may be generated. Therefore, adequate tight contact between the tapered portion of the tool and the tapered hole of the spindle may not be achieved. The tool may not be drawn into a correct position by a draw bar. The tool may be fixed to the spindle in an inclined state. Consequently, the position of the tool is shifted from a desired position, which may cause a problem of lowering of machining accuracy of the workpiece.

It is an object of the present invention to provide a tool mount evaluation method for determining whether or not a tool is mounted on a spindle in a correct state and a machine tool.

A tool mount evaluation method of the present invention is a tool mount evaluation method when mounting a tool on a spindle by drawing the tool with a draw bar arranged in the spindle of a machine tool, including: a storage step for storing a position of the draw bar in an axial direction when the tool comes into contact with an attachment seat as a reference position in a state in which foreign substances on a surface of the attachment seat of the spindle and on a contact surface of the tool are removed; a measurement step for measuring the position of the draw bar in the axial direction when the tool is mounted on the spindle as a measured position; and a determination step for determining that a mounted state of the tool is abnormal when an error of the measured position with respect to the reference position exceeds a predetermined determination range.

In the above-described invention, the storage step can include a step of measuring the reference position by using the machine tool or a step of measuring the reference position by using a tool mounting device which simulates the machine tool.

In the above-described invention, in the measurement step, the measured position can be measured by an induction type displacement sensor.

In the above-described invention, dogs for detecting the measured position of the draw bar in the axial direction are disposed on a draw bar and on a piston that presses the draw bar, and in the measurement step, a measured position when the tool is mounted on the spindle and the measured position when the draw bar is drawn without mounting the tool on the spindle can be detected by the dog disposed on the draw bar, and the measured position when the tool is released can be detected by the dog disposed on the piston that presses the draw bar.

The machine tool of the present invention includes a spindle device configured to mount the tool on the spindle by drawing the tool by the draw bar arranged in the spindle, a position detector configured to detect the position of the draw bar in the axial direction, and a control device configured to control the machine tool. The control device includes a storage unit configured to store the position of the draw bar in association with the tool, and a determination unit configured to determine the mounted state of the tool based on the measured position of the draw bar in the axial direction, which is detected when the tool is mounted on the spindle. The storage unit stores the position of the draw bar in the axial direction as a reference position, which is detected when the tool comes into contact with the attachment seat in a state in which foreign substances on the surface of the attachment seat of the spindle and the contact surface of the tool are removed. The determination unit is configured to determine that the mounted state of the tool is abnormal when an error of the measured position with respect to the reference position exceeds a predetermined determination range.

According to the present invention, a tool mount evaluation method for determining whether or not a tool is mounted on a spindle in a correct state and a machine tool are provided.

DETAILED DESCRIPTION OF THE INVENTION

Referring to FIG. 1 to FIG. 6, a tool mount evaluation method and a machine tool according to an embodiment will be described. The machine tool of the present embodiment is of a numerically controlled type that performs machining automatically by moving the tool and the workpiece relatively in accordance with a machining program.

Figure 1:
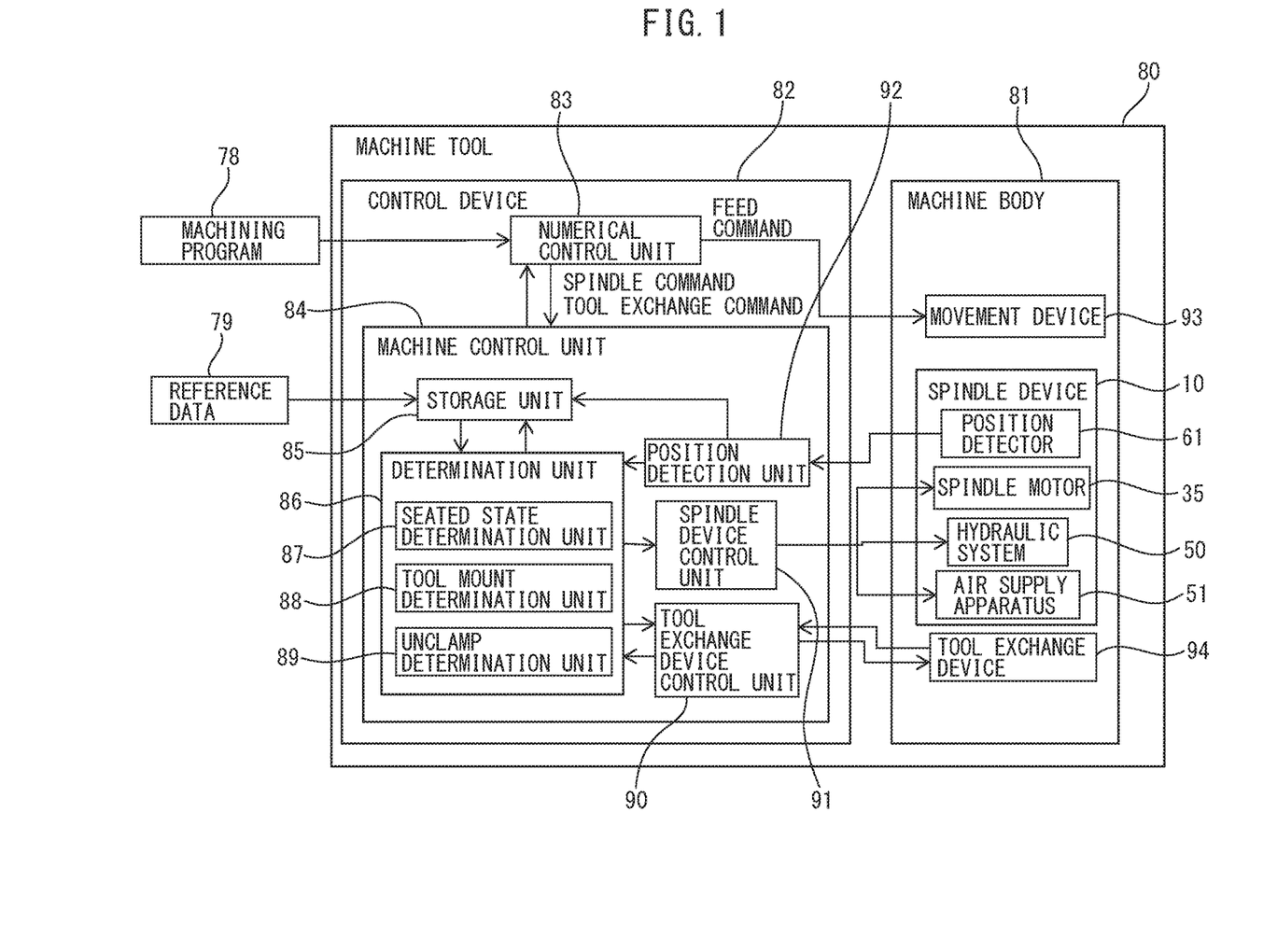
FIG. 1 is a block diagram of a machine tool according to an embodiment.

FIG. 1 shows a block diagram illustrating a machine tool according to the present embodiment. A machine tool 80 includes a machine body 81 and a control device 82. The machine body 81 includes a spindle device 10 that rotatably supports the tool and a movement device 93 that moves the tool and a workpiece with respect to each other. For example, the machine body 81 has predetermined linear feed axes including X-axis, Y-axis, and Z-axis that are orthogonal to each other. The movement device 93 includes an X-axis movement device that moves the tool in the X-axis direction and a Y-axis movement device that moves the tool in the Y-axis direction. The movement device 93 includes a Z-axis movement device that moves a table on which the workpiece is fixed in the Z-axis direction. As the movement device 93, the mode is not limited thereto, and an arbitrary device configured to move the tool relative to the workpiece can be employed.

The machine body 81 includes a tool exchange device 94. The machine tool 80 of the present embodiment is formed so as to allow multiple types of tools to be used in machining of a single workpiece. The tool exchange device 94 includes a tool magazine that can store the tools. The tool exchange device 94 can exchange the tool mounted on the spindle device 10. The tool exchange device 94 automatically exchanges the tool in accordance with a procedure that is programmed in a machining program 78.

The control device 82 includes an arithmetic processing device which includes, for example, a CPU (Central Processing Unit), a RAM (Random Access Memory), and a ROM (Read Only Memory) which are connected to one another via buses. The machining program 78 in which a procedure for machining a workpiece is set is input to the machine tool 80. The control device 82 controls the machine body 81 based on the machining program 78.

The control device 82 includes a numerical control unit 83. The numerical control unit 83 sends a feed command for instructing the feed axis to the movement device 93 based on the machining program 78. The movement device 93 moves the tool and the workpiece with respect to each other based on the feed command.

The control device 82 includes a machine control unit 84. The numerical control unit 83 sends a spindle command that controls the spindle and a tool exchange command that controls exchange of the tool based on the machining program 78 to the machine control unit 84. The spindle command includes, for example, a command relating to a rotation of the spindle and a command relating to a state of holding the tool. The tool exchange command includes, for example, a command relating to tool exchange numbers which represent numbers for the tool exchange operation.

The machine control unit 84 includes a spindle device control unit 91. The spindle device control unit 91 controls the spindle device 10 based on the spindle command and the tool exchange command. The machine control unit 84 includes a tool exchange device control unit 90. The tool exchange device control unit 90 controls the tool exchange device 94 based on the tool exchange command. The machine control unit 84 includes a position detection unit 92. The machine control unit 84 includes a determination unit 86 that determines a mount condition of the tool based on the measured position of the draw bar 22. The position detection unit 92 detects the position of the draw bar 22 in an axial direction by receiving a position signal from a position detector 61.

Figure 2:
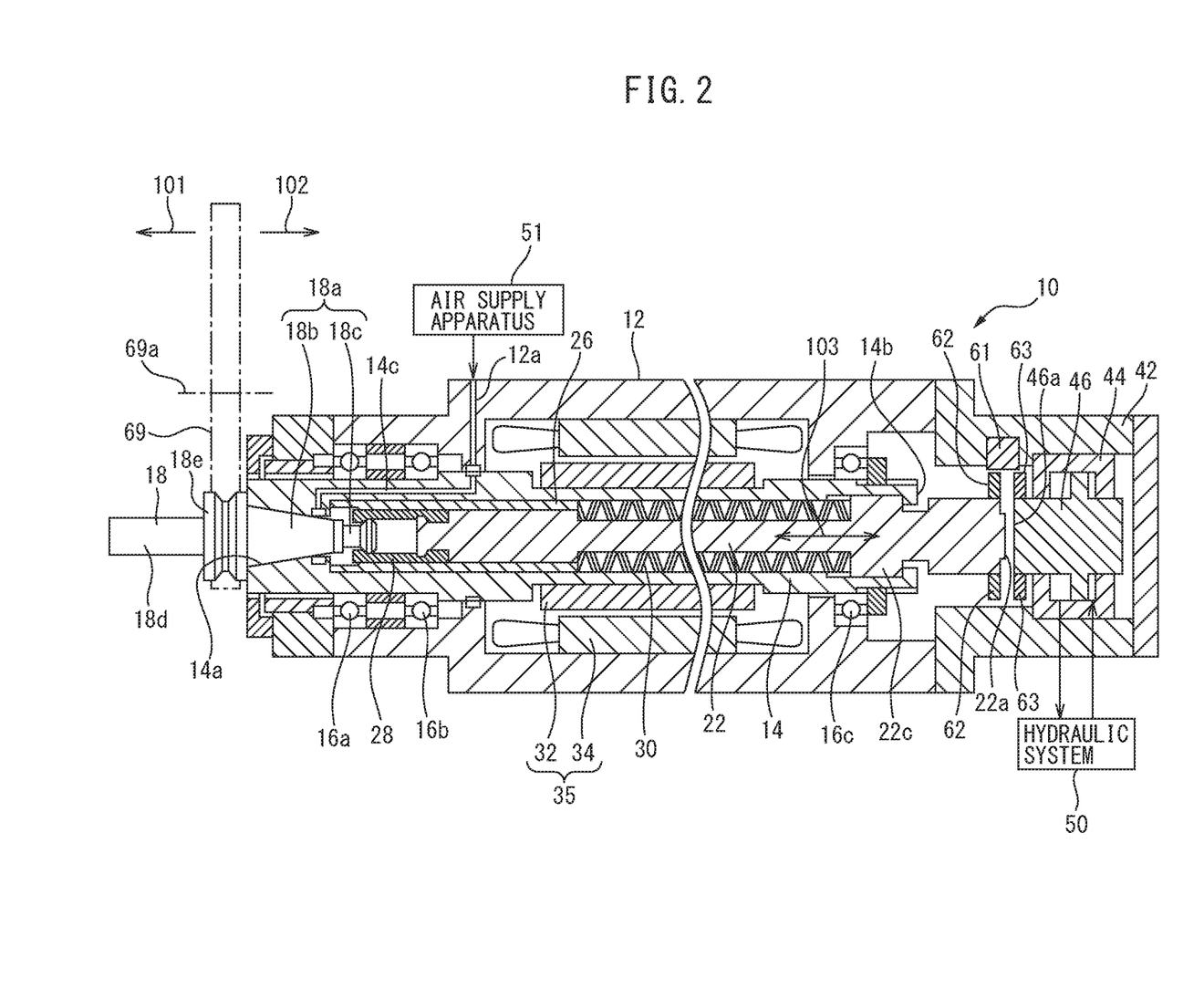
FIG. 2 is a cross-sectional view of a spindle device according to the embodiment.

FIG. 2 illustrates a cross-sectional view of the spindle device according to the present embodiment. In the present embodiment, a direction in which the tool 18 is disposed is referred to as a front side, and a side where a piston 46 is provided is referred to as a rear side. Referring to FIG. 1 and FIG. 2, the spindle device 10 includes a housing 12 that has a hollow shape. The spindle device 10 includes a spindle 14 rotatably supported by the housing 12 via the bearings 16a, 16b, 16c. The spindle device 10 includes a spindle motor 35 that rotates the spindle 14. The spindle motor 35 of the present embodiment is the motor of a built-in type. The spindle motor 35 includes a rotor 32 that is fixed to an outer peripheral surface of the spindle 14 and a stator 34 that is fixed to an inner peripheral surface of the housing 12.

At a distal end portion of the spindle 14, a conical-shaped tapered hole 14a that increases in diameter toward the front side of the spindle 14 is formed. The tapered hole 14a is configured to allow attachment of the tool 18. The tapered hole 14a corresponds to an attachment seat for mounting the tool 18 to the spindle 14.

In the present invention, a portion including a machining member 18d such as a drill, an end mill, and the like, and being mounted on or dismounted from the spindle 14 is referred to as the tool 18. The tool 18 includes the machining member 18d and a holder 18a configured to hold the machining member 18d. In the present embodiment, the machining member 18d and the holder 18a are replaced integrally. The holder 18a includes a tapered portion 18b and a pull stud portion 18c. The tapered portion 18b is formed into a truncated conical shape. An outer surface of the tapered portion 18b is formed to match an inner surface of the tapered hole 14a. In other words, the tapered portion 18b is formed so as to fit the tapered hole 14a. The pull stud portion 18c is provided at a rear end of the tapered portion 18b.

The spindle 14 includes a hollow portion in the interior thereof. The draw bar 22 is inserted into the hollow portion of the spindle 14 so as to be movable in the axial direction of the spindle 14. A guide cylinder 26 is inserted into a front area of the hollow portion of the spindle 14. The draw bar 22 is inserted into the interior of the guide cylinder 26. The draw bar 22 moves along the guide cylinder 26 as indicated by an arrow 103.

The draw bar 22 includes a guide portion 22c that comes into contact with an inner surface of the spindle 14. A disc spring 30 serving as an urging member is disposed between the guide cylinder 26 and the guide portion 22c. The disc spring 30 urges the draw bar 22 with respect to the spindle 14 rearward along a center axis. The urging member that urges the draw bar 22 is not limited to the disc spring, and other urging members such as a coil spring may also be used.

A collet 28 that engages with the pull stud portion 18c of the holder 18a is disposed at a distal end portion of the draw bar 22. The collet 28 is configured to engage with the pull stud portion 18c when the draw bar 22 moves rearward in the interior of the spindle 14. The collet 28 is configured to open and disengage from the pull stud portion 18c when the draw bar 22 moves forward.

The housing 12 includes a bracket portion 42 disposed at a rear end portion. The spindle device includes an unclamp device for moving the draw bar 22 forward. The unclamp device is disposed rearward of the draw bar 22. The unclamp device includes a cylinder 44 that is disposed in the interior of the bracket portion 42 and a hydraulic system 50 that drives the cylinder 44. The cylinder 44 includes the piston 46 that is slidably disposed in the interior thereof. A distal end portion 46a of the piston 46 comes into abutment with a rear end portion 22a of the draw bar 22 when the piston 46 moves forward. The cylinder 44 includes two hydraulic chambers that are isolated by the piston 46 in the interior thereof. When the hydraulic system 50 supplies high-pressure control oil to the hydraulic chambers at the front and the rear of the cylinder 44, the piston 46 is driven.

When the high-pressure control oil is supplied to the hydraulic chamber on the front side of the cylinder 44, the piston 46 moves rearward. The distal end portion 46a of the piston 46 moves apart from the rear end portion 22a of the draw bar 22. The draw bar 22 is urged rearward by an urging force that is applied by the disc spring 30.

In the present invention, a state in which the piston 46 is moved apart from the draw bar 22 and urged in a direction in which the collet 28 closes is referred to as a clamped state. The clamped state includes a state in which the tool 18 is mounted on the tapered hole 14a of the spindle 14 and a state in which the tool 18 is not mounted on the tapered hole 14a of the spindle 14.

When the spindle device 10 is brought into the clamped state with the tool 18 mounted on the spindle 14, the collet 28 draws the tool 18 inward of the spindle 14. When the tool 18 is drawn by the draw bar 22, the tool 18 can be fixed by being brought into tight contact with the tapered hole 14a of the spindle 14. In contrast, when the spindle device 10 is brought into the clamped state with the tool 18 not mounted on the spindle 14, the draw bar 22 moves rearward by the urging force that is applied by the disc spring 30. The draw bar 22 moves to a position where the guide portion 22c is locked by a lock portion 14b of the spindle 14.

In contrast, when the high-pressure control oil is supplied to the hydraulic chamber on the rear side of the cylinder 44, the piston 46 moves forward. The distal end portion 46a of the piston 46 comes into abutment with the rear end portion 22a of the draw bar 22. The piston 46 pushes the draw bar 22, whereby the draw bar 22 moves forward. Accordingly, the collet 28 opens. When the tool 18 is mounted on the spindle 14, the pull stud portion 18c of the holder 18a is released. The tool 18 is then allowed to be pulled out from the tapered hole 14a of the spindle 14. Alternatively, when the tool 18 is mounted on the tapered hole 14a of the spindle 14, insertion of the tool 18 can be performed.

In the present invention, a state in which the piston 46 pushes the draw bar 22 is referred to as an unclamped state. Pulling out of the tool 18 and insertion of the tool 18 can be performed in the unclamped state.

The tool exchange device 94 of the present embodiment includes a tool exchange arm 69. The tool exchange arm 69 is rotatably formed around a rotating shaft 69a. The tool exchange arm 69 rotates so as to hold a next tool 18 to be mounted on the spindle 14 at one end, and hold the current tool 18 mounted on the spindle 14 at the other end. The tool exchange arm 69 can hold the tool 18 by detachably gripping a flange portion 18e of the holder 18a.

The tool exchange arm 69 is configured to be movable in the axial direction of the spindle 14 as indicated by arrows 101, 102. When pulling out the used tool 18 from the spindle 14, the tool exchange arm 69 moves forward as indicated by the arrow 101 while holding the tool 18. The tool exchange arm 69 rotates by 180 degrees so as to place the next tool 18 on an axial line of the spindle 14. The tool exchange arm 69 moves rearward as indicated by the arrow 102 to mount the next tool 18 to the spindle 14.

The tool exchange device is not limited to this mode, and an arbitrary device that mount or dismount the tool to the spindle can be employed.

The spindle device 10 includes the position detector 61 for detecting the measured position where the position of the draw bar 22 in the axial direction is measured. The position detector 61 is disposed inside the bracket portion 42. The position detector 61 is a position sensor that is capable of outputting the position signal of the draw bar 22. In the present embodiment, an induction type displacement sensor is used as the position detector 61. The draw bar 22 is provided with a dog 62 at a distal end thereof. The dog 62 moves together with the draw bar 22. The dog 62 of the present embodiment is formed of a metal.

The induction type displacement sensor includes a coil of a printed board disposed in the interior thereof. When the coil of the printed board is driven, a magnetic field is generated around the coil. When the dog that is formed of a metal enters the magnetic field, an eddy current is generated on a surface of the dog by an action of electromagnetic induction. A position of the dog 62 can be detected by detecting an amount of change of the inductance. A resolution power of the position detector 61 of the present embodiment is 1024 bits. In other words, the position of the dog can be detected in a range of bit values between 0 bits and 1023 bits. The position of the draw bar 22 can be detected based on the position of the dog 62.

The dog 62 of the present embodiment is formed into a disc shape. Therefore, at any rotational angles after the rotation of the spindle 14, the dog 62 opposes the position detector 61. Therefore, the position detector 61 can detect the position of the draw bar 22 even after the spindle 14 has rotated. The position detector 61 can include an arbitrary sensor that is capable of detecting the position of the draw bar 22.

Figure 3:
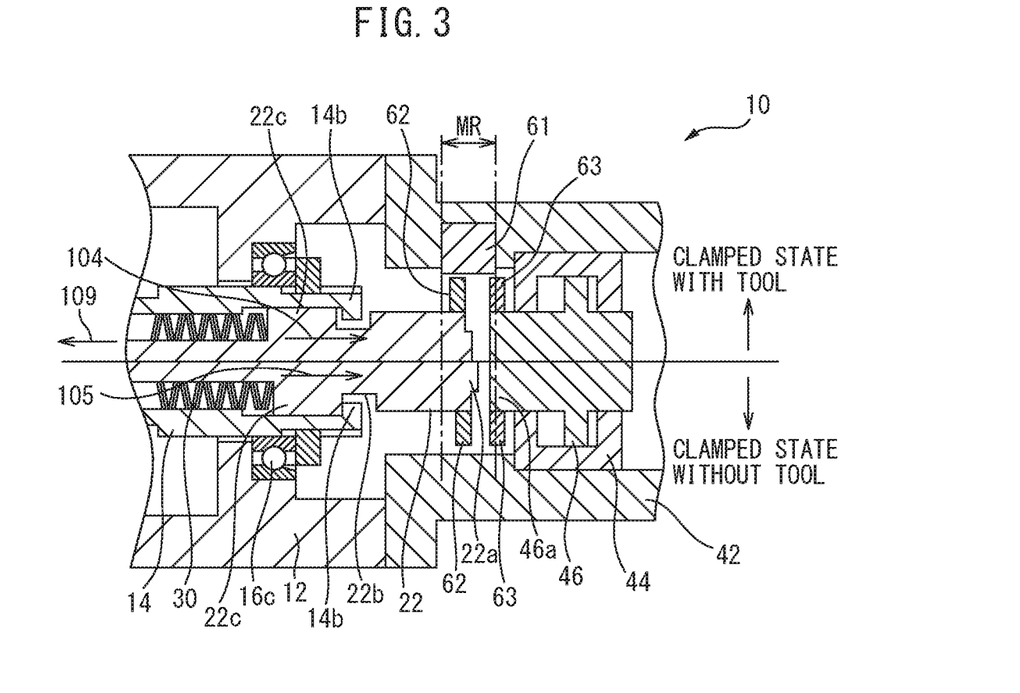
FIG. 3 is a cross-sectional view of the spindle device for explaining a clamped state when the tool is mounted and a clamped state when the tool is not mounted.

FIG. 3 is an enlarged cross-sectional view of the spindle device for explaining a clamped state when the tool is mounted on the spindle and a clamped state when the tool is not mounted on the spindle. In the clamped state in which the tool 18 is mounted on the spindle 14, the draw bar 22 is urged by the disc spring 30 rearward as indicated by an arrow 104. The movement is stopped when the tapered portion 18b of the tool 18 comes into contact with the tapered hole 14a of the spindle 14. A gap is formed between the lock portion 14b and the guide portion 22c.

In the clamped state in which the tool 18 is not mounted on the spindle 14, the draw bar 22 moves rearward more than the clamped state in which the tool 18 is mounted on the spindle 14. The draw bar 22 is provided with a depressed portion 22b. The guide portion 22c of the draw bar 22 is locked by the lock portion 14b of the spindle 14, whereby movement of the draw bar 22 rearward indicated by an arrow 105 is stopped.

In the clamped state in which the tool 18 is mounted on the spindle 14 and in the clamped state in which the tool 18 is not mounted on the spindle 14, the rear end portion 22a of the draw bar 22 is apart from the distal end portion 46a of the piston 46. In the both cases, the dog 62 that is attached to the draw bar 22 is disposed within a measurement range MR of the position detector 61. Therefore, the position detector 61 is capable of detecting the position of the draw bar 22 by the dog 62.

Figure 4:
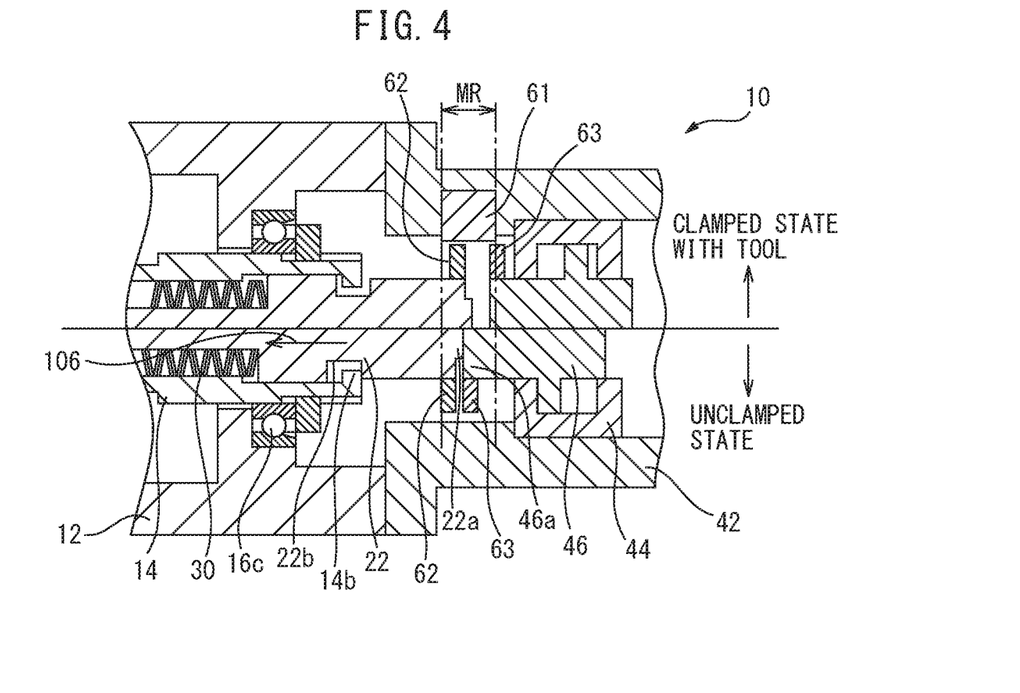
FIG. 4 is a cross-sectional view of the spindle device for explaining the clamped state when the tool is mounted and the unclamped state.

FIG. 4 is an enlarged cross-sectional view of the spindle device for explaining the clamped state when the tool is mounted on the spindle and the unclamped state. In the unclamped state, the piston 46 presses the draw bar 22 as indicated by an arrow 106. At this time, the dog 62 attached to the draw bar 22 is disposed out of the measurement range MR of the position detector 61.

In the present embodiment, a dog 63 is disposed at the distal end portion 46a of the piston 46. In the present embodiment, the rear end portion 22a of the draw bar 22 is formed so as to protrude. The dog 62 and the dog 63 are disposed apart from each other. The dog 63 is formed of a metal and has a disc shape. The dog 63 moves together with the piston 46. In the unclamped state, the dog 63 is disposed within the measurement range MR of the position detector 61. Therefore, the position detector 61 is capable of detecting the position of the piston 46 by detecting the position of the dog 63. Since the piston 46 is in contact with the draw bar 22, the position of the draw bar 22 can be detected.

In this manner, the position of the draw bar 22 in the unclamped state can be detected by the dog 63 disposed on the piston 46 that pushes the draw bar 22. The position of the draw bar 22 in both states, namely the clamped state and the unclamped state can be detected by a single position detector 61. Alternatively, the position of the draw bar 22 in both states, namely the clamped state and the unclamped state, can be detected by a compact position detector.

When the piston 46 is configured so as not to rotate about the axial line of the spindle 14, the dog 63 do not need to be formed into a disc shape as long as it is formed in a portion that opposes the position detector 61.

Referring to FIG. 1 and FIG. 2, the machine tool 80 includes an air supply apparatus 51 that supplies compressed air into the interior of the tapered hole 14a of the spindle 14. The housing 12 includes an air flow channel 12a that is formed therein to allow passage of air. The spindle 14 is provided with an air flow channel 14c that is formed therein to allow passage of air. The housing 12 is provided with a groove portion 12c at a portion where the air flow channel 12a comes into contact with the spindle 14. The groove portion 12c is formed entirely in a circumference direction of the spindle 14. Therefore, even when the spindle 14 rotates, the groove portion 12c communicates with the air flow channel 14c. The air supply apparatus 51 can supply compressed air into the interior of the tapered hole 14a at an arbitrary rotational angle of the spindle 14.

In the interior of the machining chamber, machining fluid, chips, and the like scatter. Therefore, foreign substances may be caught between the tapered portion 18b of the tool 18 and the tapered hole 14a of the spindle 14 when the tool 18 is mounted on or dismounted from the spindle 14. When the tool 18 is of a double-sided constraining type, foreign substances may be caught between an end surface on the front side of the spindle 14 and the flange portion 18e of the holder 18a. When the foreign substances are caught, the tool 18 is not be drawn by the draw bar 22 to a desired position in the interior of the spindle 14.

In the present invention, a state in which no foreign substance is caught between the holder 18a and the spindle 14, i.e., a state in which the whole of contact portion of the tool 18 is in contact with the attachment seat of the spindle 14 is referred to as being seated. In other words, a state in which the outer peripheral surface of the tool 18 is in tight contact with the attachment seat of the spindle 14 is referred to as being seated. Referring to FIG. 3, the position of the draw bar 22 when foreign substances are caught is shifted toward the front with respect to the position when the tool is seated on the attachment seat as indicated by an arrow 109.

The tapered hole 14a of the spindle 14 may have a manufacturing error. The holder 18a of the tool 18 may also have a manufacturing error. As a result of manufacturing errors, the position of the draw bar 22 may be shifted from a predetermined position. For example, if the shape or the length of the pull stud portion 18c is deviated from designed values, the position of the draw bar 22 is also shifted from the predetermined position.

Therefore, in the clamped state where the tool is mounted, even when a positional error of the draw bar 22 is detected by the position detector 61, it is difficult to determine whether the error is caused by entry of foreign substances or the error is caused by the manufacturing error of the tool 18 or the spindle 14. Therefore, it is difficult to determine whether the mounted state of the tool has a problem or the shape of the tool or the spindle has a problem only by simply measuring the position of the draw bar 22 by the position detector 61.

Therefore, in the tool mount evaluation method of the present embodiment, the position of the draw bar 22 in the axial direction when the tool 18 is mounted on the spindle 14 is measured in advance in a state in which foreign substances on the contact surface of the tapered portion 18b of the tool 18 and the surface of the tapered hole 14a of the spindle 14 are removed. In other words, the position of the draw bar 22 when the tool 18 is seated in the tapered hole 14a is measured.

In the present invention, the positions of the draw bar 22 in the axial direction at a normal state where an effect of foreign substances is eliminated in the clamped state and in the unclamped state are referred to as a reference position. In particular, in the clamped state where the tool 18 is mounted on the spindle 14, the position of the draw bar 22 in the axial direction when the tool 18 is seated on the attachment seat of the spindle 14 corresponds to the reference position.

The reference position can be measured by using the machine tool 80 that is actually used for machining. The surface of the tapered hole 14a that corresponds to the surface of the attachment seat of the spindle 14 is cleaned. The surface of the holder 18a that corresponds to the contact surface of the tool 18 is also cleaned. Next, the tool 18 is mounted on the spindle 14 and the clamped state is achieved. In this state, the reference position of the draw bar 22 can be measured by the position detector 61. Measurement of the reference position can be performed individually for the respective tools 18. The reference positions can be set for the respective tools. The reference positions can be measured in advance in the clamped state when the tool is not mounted and the unclamped state.

The result of measurement of the reference positions for tools is indicated in Table 1. In the example of Table 1, the reference positions of the tools 18 from a tool number T0001 to a tool number Tnnnn are indicated. Referring to FIG. 3 and FIG. 4, the position of the draw bar 22 is indicated by using a unit of bit, and the value increases as it goes rearward of the spindle device. As described above, the position is detected by the dog 62 in the clamped state. The position is detected by the dog 63 in the unclamped state.

TABLE 1

Reference Position of Draw Bar

| | tool No. | reference position [bit] |
|---|---|---|
| clamped state (tool mounted) | T0001 | 145 |
| | T0002 | 150 |
| | T0003 | 143 |
| | ⋮ | ⋮ |
| | Tnnnn | 147 |
| clamped state (no tool mounted) | | 210 |
| unclamped state | | 535 |

Referring to FIG. 1, information on the reference positions as described above is included in reference data 79 for each of the tools 18. The control device 82 includes a storage unit 85 that stores the position of the draw bar 22. The reference data 79 is input to the storage unit 85 and stored therein.

In the evaluation of the mounted state of the tool 18 in an actual machining step with the machine tool, a measurement step for measuring the measured position of the draw bar 22 in the axial direction when the tool 18 to be used is mounted on the spindle 14 by the tool exchange device 94 is performed. In the present invention, the position of the draw bar 22 that is provided with the tool 18 as an object of evaluation and actually measured is referred to as a measured position. A determination step for determining that the mounted state of the tool is abnormal when the difference between the measured position and the reference position exceeds the predetermined determination range is performed.

Figure 5:
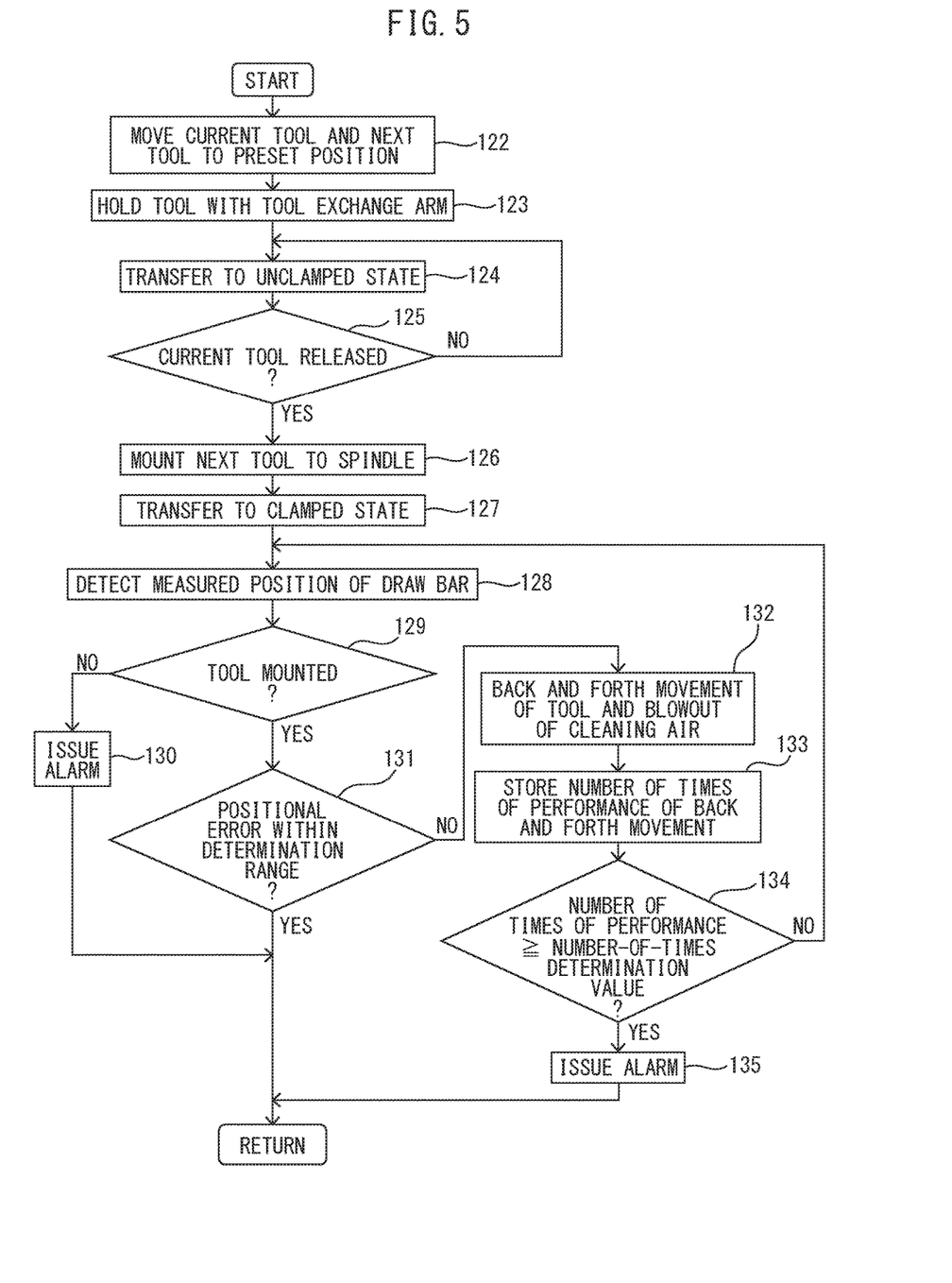
FIG. 5 is a flowchart of control for evaluating a mounted state of the tool according to the embodiment.

Referring to FIG. 1, FIG. 2, and FIG. 5, the determination unit 86 includes a seated state determination unit 87 that determines whether or not the tool is seated. When foreign substances are caught between the tool 18 and the spindle 14, the tool 18 is not seated in the tapered hole 14a of the spindle 14. The determination unit 86 includes a tool mount determination unit 88 that determines whether or not the tool 18 is mounted on the tapered hole 14a of the spindle 14. The determination unit 86 also includes an unclamp determination unit 89 that determines whether or not the tool can be mounted and dismounted in the unclamped state.

FIG. 5 shows a flowchart of control in the tool mount evaluation method of the present embodiment. The control illustrated in FIG. 5 can be performed when the tool exchange command is issued.

Referring to FIG. 1, FIG. 2 and FIG. 5, the numerical control unit 83 sends the tool exchange command to the machine control unit 84. In step 122, the numerical control unit 83 sends a feed command to the movement device 93. The movement device 93 moves the spindle device 10 to a position which allows the tool exchange arm 69 to hold the current tool. The tool exchange device control unit 90 of the machine control unit 84 drives the tool exchange device 94. The tool exchange device 94 moves the next tool 18 to a position which allows the tool exchange arm 69 to hold the next tool 18.

Next, in step 123, the tool exchange arm 69 holds the current tool 18 and the tool 18 to be used next. The two tools can be held by rotating the tool exchange arm 69. Next in step 124, the spindle device control unit 91 drives the hydraulic system 50 so as to bring the spindle device 10 into the unclamped state (see the unclamped state in FIG. 4).

Next, in step 125, the unclamp determination unit 89 determines whether or not a state which allows pulling out and insertion of the tool 18 is achieved. In other words, the unclamp determination unit 89 determines whether or not the current tool is released. As a method for confirming release of the tool, for example, the position detection unit 92 detects the measured position of the draw bar 22. Referring to Table 1, when the measured position of the draw bar 22 with respect to the reference position of the draw bar 22 in the unclamped state is within the predetermined error range, it can be determined that the tool is released. In step 125, when holding of the tool 18 is not released, the procedure goes back to step 124, and an unclamping operation is repeated for the spindle device 10. In step 125, when holding of the tool 18 is released, the procedure proceeds to step 126.

In step 126, the tool exchange device 94 drives the tool exchange arm 69 so as to mount the tool 18 to be used next in the tapered hole 14a of the spindle 14.

Next, in step 127, the spindle device control unit 91 drives the hydraulic system 50 so as to bring the spindle device 10 to the clamped state. In other words, the spindle device 10 is transferred to the clamped state when the tool is mounted as illustrated in FIG. 3. When the piston 46 is moved rearward and the holder 18a is pulled rearward by the draw bar 22, the tool 18 is fixed to the spindle 14.

Next, in step 128, after the movement of the draw bar 22 is terminated, the position detection unit 92 detects the measured position of the draw bar 22 based on a position signal from the position detector 61. The position detection unit 92 then sends the measured position of the draw bar 22 to the determination unit 86.

Next, in step 129, the tool mount determination unit 88 determines whether or not the tool 18 is mounted on the spindle 14. In this step, a case where insertion of the tool 18 into the tapered hole 14a of the spindle 14 is failed and the tool 18 is not mounted on the tapered hole 14a is assumed.

The tool mount determination unit 88 can determine whether or not the tool is mounted based on the reference position and the measured position of the draw bar 22. For example, the tool mount determination unit 88 compares the reference position and the measured position in the clamped state when the tool 18 is mounted. The tool mount determination unit 88 can determine that the tool is not mounted when the measured position is located rearward from the reference position by a certain amount (for example, 1 mm) or more. Alternatively, the tool mount determination unit 88 can determine that the tool is not mounted when the measured position with respect to the reference position in the clamped state when the tool is not mounted is within the predetermined error range.

When it is determined that the tool is not mounted in step 129, the routine proceeds to step 130. In step 130, an alarm is issued. For example, the machine tool 80 includes a display unit that displays information on machining. The control device 82 displays an alarm on the display unit. As the alarm, for example, notification to a operator indicating that the tool is failed to be mounted can be displayed and following operations of the machine tool can be stopped. When it is determined that the tool is mounted in step 129, the routine proceeds to step 131.

Next, in step 131, the seated state determination unit 87 of the determination unit 86 determines whether or not the positional error of the measured position with respect to the reference position is within the predetermined determination range. For example, it is determined whether or not an absolute value of the difference between the reference position and the measured position is not greater than a predetermined determination value (for example, 2 bits). When the positional error is within the predetermined determination range, it can be determined that foreign substances are not caught. In this case, the control is terminated. In contrast, when the positional error exceeds the predetermined determination range, the procedure proceeds to step 132.

In step 132, the tool exchange device 94 performs a back and forth movement for detaching and attaching a next tool 18 that has been mounted on the spindle 14. In addition, the spindle device control unit 91 drives the air supply apparatus 51 so as to supply air (cleaning air) between the tapered portion 18*b* of the holder 18*a* and the tapered hole 14*a* of the spindle 14. By detaching and attaching the tool 18 with respect to the spindle 14, a gap is formed between the tapered portion 18*b* and the tapered hole 14*a*. Air that is supplied from the air supply apparatus 51 is discharged through the gap. At this time, since a flow rate of the air that passes through the gap is high, foreign substances that exists between the tapered portion 18*b* and the tapered hole 14*a* can be discharged. In this manner, the spindle device 10 can perform a cleaning operation so as to remove foreign substances. Next, in step 133, the number of times of performance of the back and forth movement for detaching and attaching the tool 18 with respect to the spindle 14 is stored.

Next, in step 134, it is determined whether or not the number of times of performance of the back and forth movement reaches the predetermined number-of-times determination value. In other words, when the positional error exceeds the determination range even when the back and forth movement of the tool 18 and ejection of the cleaning air are performed by several times, the cleaning operation is stopped. In this case, the procedure proceeds to step 135. In step 135, an alarm is issued. The control device 82 can display an indication that notifies the operator the fact that foreign substances are caught in the display unit.

When the number of times of performance of the back and forth movement is smaller than the predetermined number-of-times determination value in step 134, the procedure goes back to step 128 again. The measured position of the draw bar 22 is detected, and it is confirmed whether or not the positional error of the measured position with respect to the reference position is within the determination range. By repeating the cleaning operation as described above, even though foreign substances are present between the tool 18 and the spindle 14, removal of the foreign substances can be promoted.

The tool evaluation method and the machine tool of the present embodiment are configured so as to set the reference positions for the respective tools, and evaluate the mounted states of the tools based on the errors of the measured position with respect to the reference position. Therefore, it can be determined whether or not the tool is mounted on the spindle in a correct state. In particular, the presence or the absence of entry of foreign substances can be evaluated with high degree of accuracy while eliminating the influence of the manufacturing errors of the tool 18 and the spindle 14.

In the embodiment described above, the reference positions that relates to the respective tools are measured by using the machine tool 80 that is actually used for machining. The method for setting the reference position is not limited to this mode, but the reference position can be set by the tool mounting device which simulates the machine tool. The tool mounting device is referred to as a tool presetter.

Figure 6:
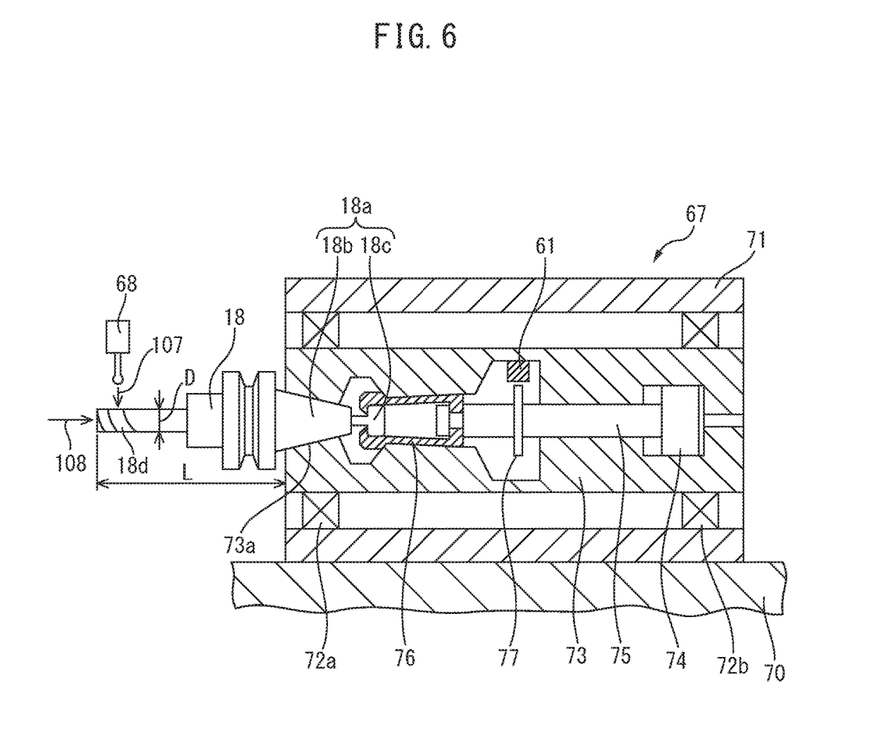
FIG. 6 is a schematic cross-sectional view of the tool mounting device according to the embodiment.

FIG. 6 illustrates a schematic cross-sectional view of the tool mounting device according to the present embodiment. The tool mounting device 67 is disposed on an installation table 70. The tool mounting device 67 includes a housing 71 and a rotation member 73 disposed in the interior of the housing 71. The rotation member 73 corresponds to the spindle 14 of the machine tool. The rotation member 73 is rotatably supported via the bearings 72*a*, 72*b*. A draw bar 75 is disposed in the interior of the rotation member 73. A collet 76 is connected to one end portion of the draw bar 75. A piston 74 is connected to the other end portion of the draw bar 75. The piston 74 is formed so as be moved by a hydraulic system.

The tool mounting device 67 can measure a tool diameter D and a tool length L of the machining member 18*d* such as an end mill. For example, the tool diameter D can be measured by pushing a probe 68 against the machining member 18*d* as indicated by an arrow 107. Alternatively, the tool length L can be measured by pushing the probe 68 against an end surface of the machining member 18*d* as indicated by an arrow 108.

The tool mounting device 67 of the present embodiment includes a disc-shaped dog 77 disposed on the draw bar 75. A position detector 61 is disposed in the interior of the rotation member 73 so as to oppose the dog 77. The position detector 61 outputs a position signal of the draw bar 75 in the axial direction. The tool mounting device 67 is provided with a control device. An output signal of the position detector 61 is transmitted to the control device. The control device calculates the position of the draw bar 75.

A tapered hole 73*a* is formed at an end portion of the rotation member 73. The tapered hole 73*a* preferably has the same shape as the tapered hole 14*a* of the spindle 14 of the actual machine tool 80. The collet 76 and the like preferably also have the same shape as the collet 76 of the actual machine tool 80.

In the measurement of the reference position, the surface of the tapered hole 73*a* and the surface of the holder 18*a* are washed so as to remove the foreign substances. The position detector 61 measures the position of the draw bar 75 when the tool 18 is mounted on the tapered hole 73*a* and is brought into the clamped state. This position is a position that corresponds to the reference position of the tool.

The dimensional difference between the tool mounting device 67 and the actual spindle device 10 can be measured in advance. By adding or subtracting the dimensional difference with respect to the position measured by the tool mounting device 67, the reference position in the clamped state when the tool 18 is mounted on the spindle 14 can be calculated.

In this manner, by setting the reference position of the machine tool 80 while using the tool mounting device 67 that simulates the actual machine tool 80, it is not necessary to measure the reference position by the machine tool 80 and the operation rate of the machine tool 80 can be improved. Alternatively, the reference position can be set in advance even in a place where the machine tool 80 is not provided.

8The tool mounting device that simulates the machine tool is not limited to the above-described mode, and tool mounting devices having any structures can be employed.

In the spindle device of the embodiment described above, the tapered hole of the spindle holds the tool as an attachment seat. In other words, the tool is constrained by the spindle at one surface, but the tool is not limited to the mode. The tool may be constrained by the spindle at two or more surfaces. For example, it is known a spindle device in which the tool is constrained in the tapered hole in the spindle by drawing the tool by the draw bar, and a flange portion of a holder of the tool is brought into contact with the end surface of the spindle and constrained. For example, there is an HSK shank. The present invention can also be applied to a spindle device configured to constrain the tool with two surfaces, namely, the surface of the tapered hole and the end surface of the spindle.

In the respective controls described above, the order of steps can be appropriately changed within a range in which the function and effects are not changed. The embodiments described above can be combined as needed. In the respective drawings described above, the same or equivalent portions are denoted by the same reference numerals. The above-described embodiments are examples only, and are not intended to limit the invention. In the embodiments, modification of the modes described in Claims is included.

REFERENCE SIGNS LIST 10 spindle device
14 spindle
14a tapered hole
18 tool
18a holder
18b tapered portion
22 draw bar
44 cylinder
50 hydraulic system
61 position detector
62, 63 dog
67 tool mounting device
79 reference data
80 machine tool
82 control device
85 storage unit
86 determination unit
87 seated state determination unit
92 position detection unit

The invention claimed is:

1. A tool mount evaluation method when mounting a tool on a spindle by drawing a tool with a draw bar arranged in the spindle of a machine tool, the tool mount evaluation method comprising:
a storage step for storing a position of the draw bar in an axial direction when the tool comes into contact with an attachment seat as a reference position in a state in which foreign substances on a surface of the attachment seat of the spindle and on a contact surface of the tool are removed;
a measurement step for measuring a position of the draw bar in the axial direction when the tool is mounted on the spindle as a measured position; and
a determination step for determining that a mounted state of the tool is abnormal when an error of the measured position with respect to the reference position exceeds a predetermined determination range,
wherein dogs for detecting the measured position of the draw bar in the axial direction are disposed on the draw bar and on a piston that presses the draw bar, and
in the measurement step, the measured position when the tool is mounted on the spindle and a measured position when the draw bar is drawn without mounting the tool on the spindle are detected by the dog disposed on the draw bar, and a measured position when the tool is released is detected by the dog disposed on the piston.

2. The tool mount evaluation method according to claim 1, wherein in the measurement step, the measured positions are measured by an induction type displacement sensor.

3. A machine tool comprising:
a spindle device configured to draw a tool by a draw bar arranged in a spindle and mount the tool in the spindle;
a position detector configured to detect a position of the draw bar in an axial direction; and
a control device configured to control a machine tool, wherein
the position detector includes dogs, disposed on the draw bar and on a piston that presses the draw bar, for detecting measured positions of the draw bar in the axial direction,
the control device includes a storage unit configured to store the position of the draw bar in association with the tool, and a determination unit configured to determine a mounted state of the tool based on a measured position of the draw bar in the axial direction, which is detected when the tool is mounted on the spindle,
the storage unit stores the position of the draw bar in the axial direction as a reference position, which is detected when the tool comes into contact with an attachment seat in a state in which foreign substances on a surface of the attachment seat of the spindle and on a contact surface of the tool are removed,
the determination unit is configured to determine that the mounted state of the tool is abnormal when an error of the measured position with respect to the reference position exceeds a predetermined determination range, and
the position detector detects the measured position when the tool is mounted on the spindle,
a measured position when the draw bar is drawn without mounting the tool on the spindle, by using the dog disposed on the draw bar, and
a measured position when the tool is released, by using the dog disposed on the piston.

* * * * *